United States Patent [19]

Dunmire et al.

[11] Patent Number: 4,519,098
[45] Date of Patent: May 28, 1985

[54] WEARING APPAREL AND METHODS FOR MANUFACTURING OF WEARING APPAREL

[75] Inventors: Robert W. Dunmire, Coshocton; Drew J. Miller, Canton; Michael D. Johnson, Coshocton, all of Ohio

[73] Assignee: Becton, Dickinson and Company, Paramus, N.J.

[21] Appl. No.: 502,396

[22] Filed: Jun. 8, 1983

[51] Int. Cl.³ .................. B29D 27/04; A41D 19/00; B29C 13/04; B29H 3/044

[52] U.S. Cl. ........................ 2/161 R; 2/164; 2/167; 2/168; 2/169; 264/45.1; 264/45.3; 264/304; 264/305; 264/306; 264/338

[58] Field of Search .............. 264/45.1, 45.3, 301, 264/304, 305, 306, 338; 2/161 R, 168, 167, 164, 169

[56] References Cited

U.S. PATENT DOCUMENTS

| | | | |
|---|---|---|---|
| 2,293,928 | 8/1942 | Beal | 264/45.1 X |
| 2,297,663 | 9/1942 | Strassman | 264/301 X |
| 2,324,735 | 7/1943 | Spanel | 264/301 X |
| 2,482,418 | 9/1949 | Jenkins | 264/304 X |
| 2,853,400 | 9/1958 | Ahlbin | 264/54 X |
| 2,867,849 | 1/1959 | Drew et al. | 264/304 X |
| 3,079,274 | 2/1963 | Marsden et al. | 264/301 X |
| 3,136,832 | 6/1964 | Ballmer | 264/45.3 X |
| 3,173,150 | 3/1965 | Mohler | 2/167 |
| 3,268,355 | 8/1966 | Brodeur, Jr. | 264/301 X |
| 3,397,265 | 8/1968 | Ansell | 264/305 X |
| 3,494,989 | 2/1970 | Le May | 264/305 X |
| 3,694,117 | 9/1972 | Gould et al. | 264/304 X |
| 4,089,069 | 5/1978 | Vistins | 2/161 R |
| 4,151,662 | 5/1979 | Vistins | 2/168 X |
| 4,174,542 | 11/1979 | Vistins | 2/161 R X |
| 4,359,783 | 11/1982 | Andrews | 2/161 R |

FOREIGN PATENT DOCUMENTS

| | | | |
|---|---|---|---|
| 537736 | 5/1957 | Canada | 264/304 |
| 989266 | 4/1965 | United Kingdom | 264/304 |
| 2088389 | 6/1982 | United Kingdom | 264/305 |

OTHER PUBLICATIONS

Kenworthy, G. and A. D. S. Small, "New Techniques Used in the Production of Cosmetic Gloves", in *Medical and Biological Engineering*, vol. 12, No. 1, Jan. 1974, pp. 120-123.

Primary Examiner—Philip Anderson
Attorney, Agent, or Firm—Robert P. Grindle

[57] ABSTRACT

Methods are provided for producing protective work gloves and other wearing apparel, having a variety of different protective and surface characteristics, as desired, without any separate cutting, knitting or sewing operations, and wearing apparel so produced by such methods. The method includes, for example, developing a work glove including its liner in a series of steps applied sequentially to a single form moving through a production line. The method eliminates the need for a separate operation for producing fabric liners including cutting, sewing and the manual loading of each individual liner on a form for subsequent dipping and coating operations. The resulting gloves may be moisture impervious or breathable, and have a variety of textured surfaces for various uses.

30 Claims, 23 Drawing Figures

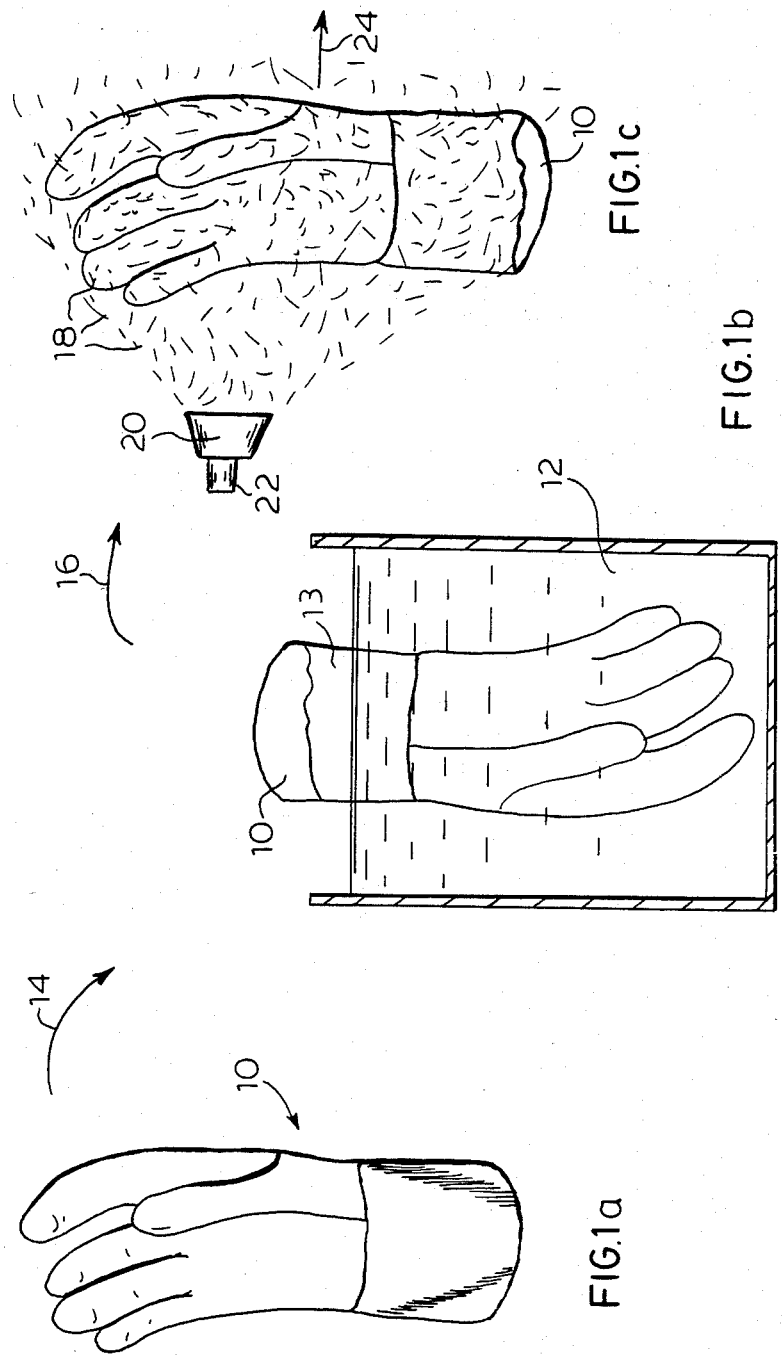

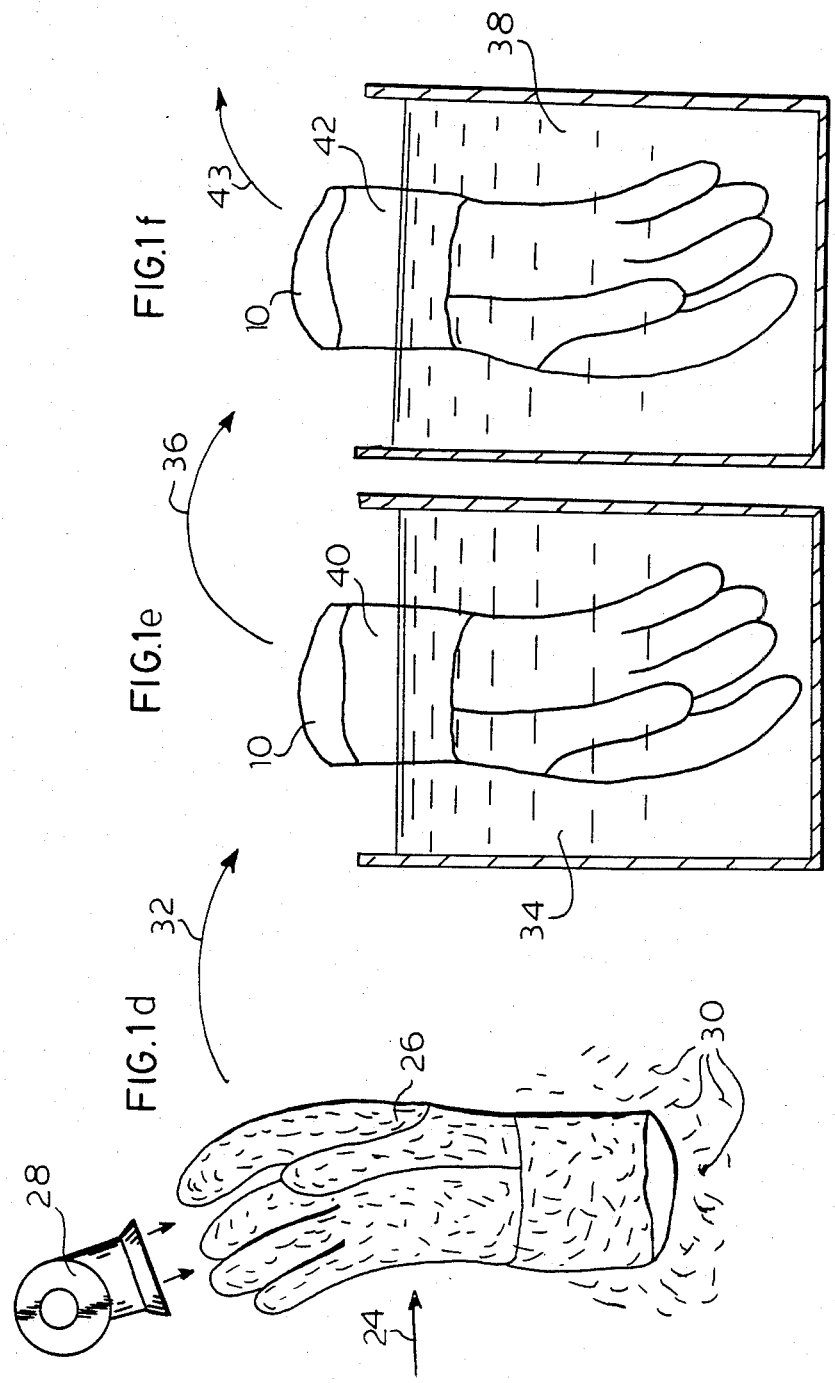

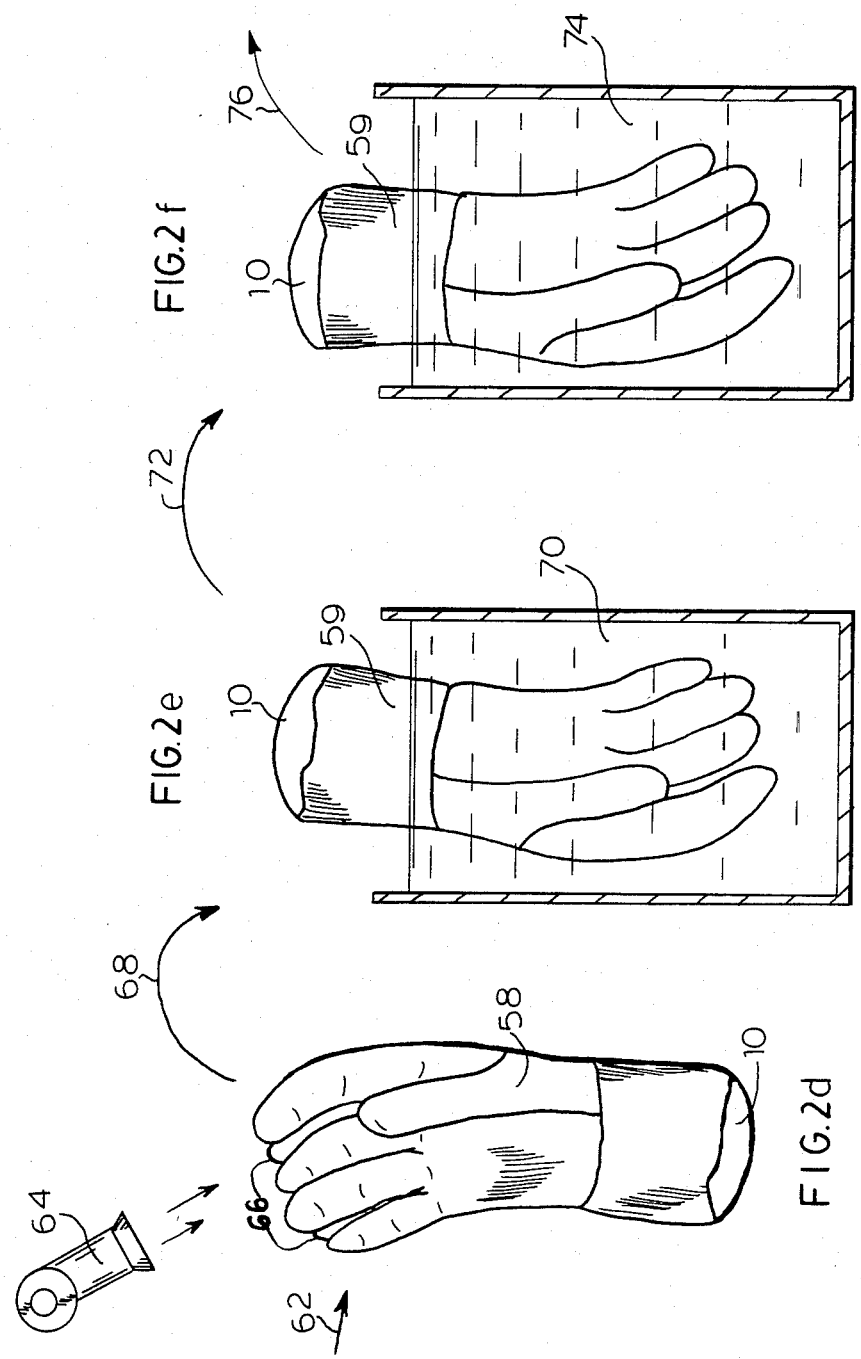

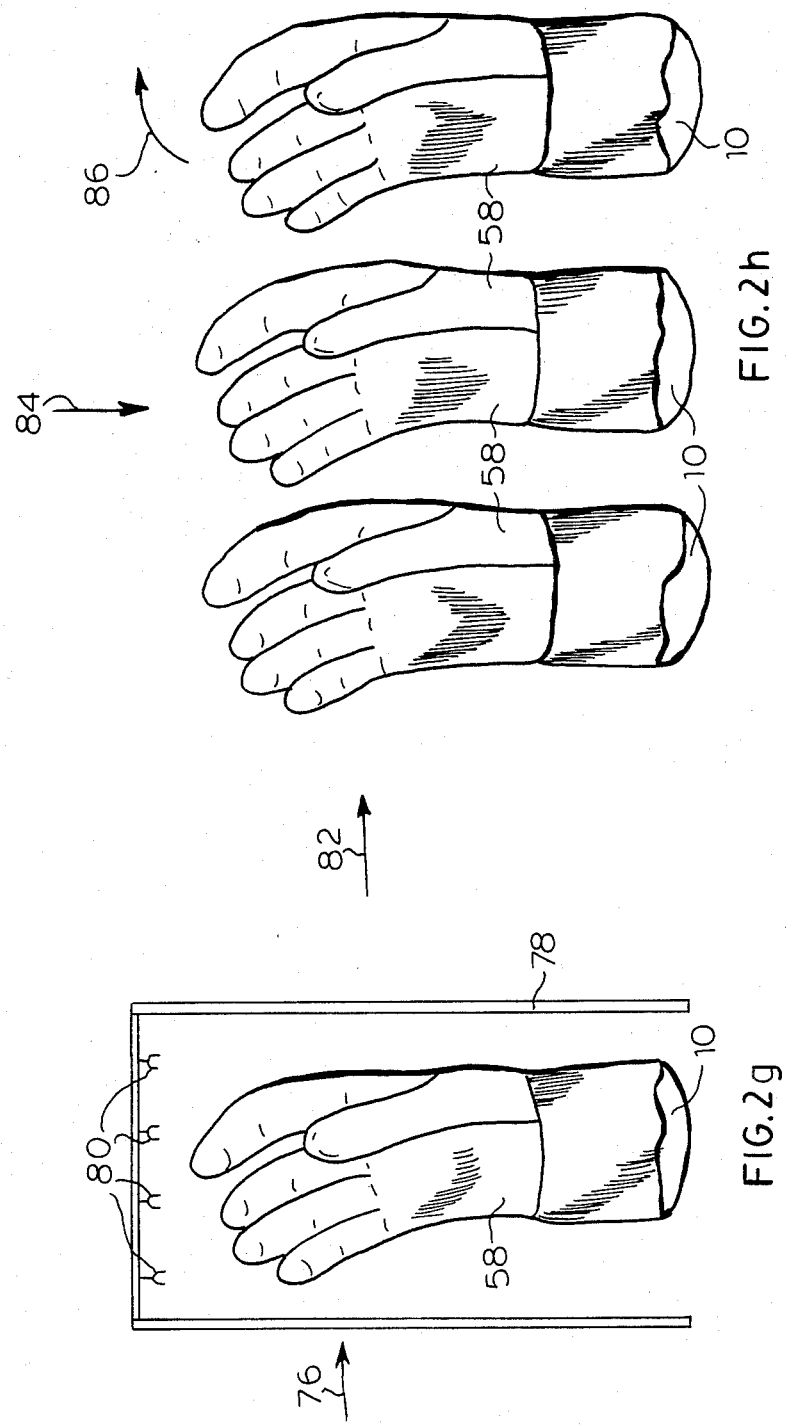

WEARING APPAREL AND METHODS FOR MANUFACTURING OF WEARING APPAREL

BACKGROUND AND STATEMENT OF THE INVENTION

This invention relates to methods for producing wearing apparel, and particularly work gloves for use in a work environment wherein protection is desired from moisture, cold, heat, chemicals and sharp edges. Also, such work gloves may be produced, in accordance herewith, which have a oil gripping characteristic for grasping greasy or oily objects and holding them properly in a work environment. The arrangement herein includes a sequential application on a form, continuously movable through a production line without removal, for producing the liner for such work gloves in a series of steps on the form, followed by the application selectively of various coatings for producing different characteristics for such work gloves, as desired.

There are many prior art arrangements for providing elastomer coated garments, such as industrial or work gloves. These include, for example, U.S. Pat. Nos. 3,173,150; 4,089,069; 4,151,662; 4,174,542; and 4,359,783. In all cases, in the production of work gloves as taught in these prior art patents, individual liners are produced separately in separate operations. That is, the liners may be comprised of several layers joined or laminated together by stitching or other operations. Once they are prepared, they are cut into appropriate piece configurations for producing the liner, and subsequently stitched together to form the liner. In some instances, in recent years, some knit liners or gloves have been produced in one piece on special machines, thereby eliminating sewing and the waste inherent with multi-piece liners, as described above. The machines themselves are elaborate and costly. In all cases, however, each individual fabric liner must be produced and individually manually loaded on to a form to be subsequently coated with one or more of a variety of selected coatings, as desired. As will be appreciated, the cost in labor and time in individually manually loading each individual liner onto the many forms in a production line operation prior to the forms passing in a sequential manner continuously through a production line to produce the coatings desired, is extraordinarily high and influences the cost of the final product.

DETAILED DESCRIPTION OF THE INVENTION

With this invention, by contrast, a plurality of garments such as work gloves or boots may be produced on a continuous production line arrangement wherein the liners are created and built up on the individual forms in a sequential stepped operation. Once the liners are formed, the liners on the forms may continuously move forward in the production line for the application of various coatings, as desired.

In the production of such gloves, for example, which are referred to by practitioners-in-the-art as supported gloves, a liner is produced in place on the form, thereby avoiding the operations of spinning, knitting, weaving, finishing, napping, cutting, sewing, handling, turning and loading of each individual liner on the forms. As will be appreciated, further, by practitioners-in-the-art, the inherent waste usually associated with forming, cutting and finishing conventional glove liners is obviated.

The supported glove liner of the invention is produced directly on the dipping form by depositing such materials as fibers, fillers, and synthetic resins in various forms and amounts to attain a liner of a desired characteristic. As will be appreciated, a plurality of such liners may be produced simultaneously since a plurality of forms may be mounted on a single mandrel or carriage for controlled, automatic, mechanical movement through a production line. A product manufactured by the process of the invention can be engineered to suit by altering the composition, the order of application, and the method of application of ingredients that make up the liner. As mentioned above, the characteristics can be altered to include a breathability property for the glove, moisture absorbency, thickness, tensile strength, penetration resistance to the coating, stretch characteristics and flexibility, and density. The composition utilized may include natural and synthetic fibers, various synthetic resins, including elastomers in liquid, foam and dry states. The liquid resins, for example, may be loaded with a selection of pigment, binders, and/or fillers for modifying the surface characteristics of the ultimate glove.

The methods of application, in accordance with this invention, include spraying, dipping and dusting for distributing a uniform deposit upon the form for the garment involved which may include gloves or boots, sleeve guards and work aprons, for example. A further aspect of the invention here is that the liners may be produced in and of themselves on the forms as essentially light-weight gloves such as cotton gloves, assuming a cotton flock is utilized, as will be described in more detail below. Thus, if such characteristics are desired for a garment such as a thin flexible cotton-type glove, they may be produced, in accordance herewith, without any subsequent application of other surface layers.

In considering generally the conditions for carrying out the method of the invention here for producing work gloves, for example, the form material utilized for mounting in a production line include such conventional materials as porcelain, steel or plastic. Once the forms are mounted on individual mandrels or indexing carriages for movement through a production line, a selected sequence of operations may take place for forming the work gloves, in accordance with this invention. In this connection, it will be understood that the mandrels utilized for carrying a plurality of forms through the line may have a bank of four to six glove forms from one side to the other and there may be two to three banks on a single mandrel. Thus, in a single step in the sequence of operations passing through a production line, in accordance herewith, fifteen to twenty-or-more forms may be moving through each stage of the operation. Of course, conveyors may be used in other production lines with forms in a single file.

For producing the liner initially, the liner for gloves is built up via multiple dips into various substances. Initially, a coagulant dip is utilized. That is, the mandrel, as discussed above, is indexed to dip the plurality of forms into a vat containing a coagulant dip. In this case, the mandrel is turned over so that the forms are indexed downwardly into the vat containing the coagulant dip. The purpose of the coagulant dip is to supply a release material for the subsequent removal of the liner from the forms, once the product of the invention has been formed on each individual form. Moreover, the coagulant material will de-stabilize subsequent liquid resin materials such as elastomers which are applied and provide a tacky surface for fibers applied to the forms.

Subsequent to the coagulant dip, the mandrels are indexed upwardly again so that the forms are moving through a production line in an upright position. At this stage, the forms pass through a hood arrangement for the application of fibers. That is, fibers are blown onto the forms which have tacky surfaces provided by the previous coagulant dip. It will be appreciated, however, that the forms may be indexed into a fluid bed for dipping the forms for picking up fibers. A representative fiber length may be about 1 mm. The fibers may be comprised of cotton, for example, or polyester, or a combination of the two. Other materials which may be used, include nylon, or a combination of polyester and nylon. Denier of the fibers will vary. A representative denier is within the range of between about 3 and 5 and a representative length will be within the range of between about 1.0 mm and 12.5 mm. Although not necessary, hydrated silica may be added to the fibers to reduce attraction to each other so that a more even application is provided in the hood where the fibers are blown. Two sources of such fibers include AKROFLOCK ® CWV-1, a product of Akron Chemical, 225 Fountain Street, Akron, Ohio 44304. AKROFLOCK ® CWV-1 is a 100% cotton material. Another source is CLAREMONT FLOCK a 100% cotton fiber produced by Claremont Flock Corporation, Claremont, N.H. 03743. The characteristics of these two products are as follows.

|  | R AKROFLOCK CWV-1 | CLAREMONT |
| --- | --- | --- |
| Raw Material-Cotton | 100% | 100% |
| Insolubles | Less than 1% | Less than 1% |
| Bulk Density - ML/50 Grams | 215 | 216 |
| Moisture | 5-7% | 5-7% |
| Oil Absorption - cc/10 Grams | 30 | 30 |
| Screen Analysis -% on |  |  |
| 40 mesh | 0 | 0 |
| 60 mesh | Trace | Trace |
| 80 mesh | 3-5 | 3-5 |
| 100 mesh | 8-12 | 8-12 |
| 140 mesh | 10-15 | 10-15 |
| 200 mesh | 15-20 | 15-20 |
| 270 mesh % thru | 50-60 | 50-60 |

This fiber application provides, in the ultimate glove, comfort against the hand, because it is the internal layer of the finished product. Also, it helps to release the final product from the form.

Subsequent to the application of the fibers, a foamed synthetic resin dip is applied to the forms, and preferably an elastomer. In this instance, the mandrel will be indexed so that the forms are dipped into the elastomeric type dip. The elastomeric dip or liquid synthetic resin dip may be polyurethane, for example, or a natural or synthetic rubber, such as acrylonitrile/butadiene copolymer, acrylonitrile-butadiene-styrene terpolymer, polyurethane, neoprene or polyvinyl chloride. This foam layer provides the "bulk" feeling characteristics of the liner. As will be appreciated by practitioners-in-the-art, the foam material may be varied to provide different degrees of strength, comfort and flexibility.

Subsequent to the application of the foam layer, a second coagulant dip is utilized, the purpose of which is to "set-up" the previous foam dip. In this connection, if the previous foam dip is an elastomeric foam which has been heat sensitized, then an application of heat may be applied at this stage in the sequence of operations. If a coagulant dip is utilized, as with the previous coagulant dip, the material is in the form of a tackifying agent which may be calcium nitrate in a water or alcohol carrier, as previously noted. Preferably, the material will be a 40% by weight calcium nitrate solution in water.

Subsequently, the forms are moved to a leach bath and the forms are indexed into the leach bath of warm water at 80°-90° F. for a period of time of about 15 minutes. The purpose of this is to leach any soluble materials from the liner. It is not necessary to leach the forms at this stage of operations if a subsequent application to be applied to the forms as the outer coating is comprised of a polyvinyl chloride plastisol. Otherwise it is preferable to leach for a period of time, as discussed above, followed by a drying operation. That is, the forms are indexed upright and moved through a drying oven for the application of heat at about 170 degrees for 30 minutes.

In a general procedure and as further illustrative of the process herein, liners produced in accordance with the procedures discussed above, may have subsequent fiber applications for producing simply a cotton liner-type of glove without any subsequent coating application. In this case, the liner may be built up with the subsequent application of further fibers. That is, instead of a deliberate drying operation at elevated temperatures, the forms may be dried at ambient for a period of time of about ten minutes followed by indexing of the forms into an adhesive dip, the purpose of which is to provide strength and a tacky surface for the next fiber application. The adhesive may be made of any synthetic resin material, and preferably an elastomer. Different degrees of strength and flexibility may be obtained by varying the characteristics of this adhesive material, as discussed above. Following this adhesive dip step, the mandrel is indexed to a fiber application hood or tunnel where the fibers are again blown against the surface of the individual forms passing upright through the tunnel. This application provides a fabric-like outer coating for the liner if they are to be used as individual cotton gloves. It will be appreciated, however, that this fiber application may also be utilized as a base for subsequent coatings, if desired. In this case, if a higher degree of adherance is desired for subsequent application of a coating, the nature of the fibers may be varied in type and length to provide this characteristic.

As further illustrative of variations in fiber application which may be utilized in this invention, a percentage of the fibers may be heat sensitive, or comprised of pre-polymers which may be finally polymerized or cross-linked by subsequent heat and/or chemical cross-linking dips. Thus, a wide variety of products may result having differing controlled surface matrices for different uses.

Subsequent to this second fiber application, the forms are dried and cured by passing the forms through a drying oven at elevated temperatures.

After passing through the oven, the liners may be stripped from the forms and excess fibers may be blown off, and they may be used, as discussed above in that state.

When a coated supported glove is to be manufactured, the individual forms will be passed or indexed to the next stage in the production line for the application of various coatings to the outer surface of the liner. For example, the next stage will be a cooling stage so that the liners are at a proper temperature after passing through the previous drying and curing stage. Thereafter, they are indexed into a liquid synthetic resin dip, for example, which may be almost any selected material. The material may be, for example, acrylonitrile. The liquid resin material used will depend on the final end use of the glove, as discussed above. It is preferable for this process if the synthetic resin material is water based, assuming that no curing stage was applied to the liner portion, since there may be an interaction between the materials of the liner and the subsequently applied coatings, otherwise.

The next stage includes a coagulant dip, again, preferably a calcium nitrate water solution. the purpose of this is to set up the previous resin dip which may be an elastomer. However, if the elastomer previously applied is heat sensitized, then rather than a coagulant dip, the forms may be passed through an oven at elevated temperatures to set up the previously applied synthetic resin material.

At this stage, the forms pass through a step in the operation where they are indexed into warm water for a rinse dip, the purpose of which is to leach out coagulant salt from the gloves being formed, as discussed above.

A representative further application in the sequence of applications for forming the gloves, in accordance herewith, may include as the next stage a foamed porous finish elastomer dip material. In this instance, the elastomer is selected to provide a superior wet grip by using a foamed elastomer material dipped over the gripping portion of the ultimate glove. Again, subsequent to this foamed elastomer application, a coagulant dip may be applied to set up the previous foamed elastomer or, alternatively, if that elastomer is heat sensitized, then the foamed elastomer may be cured by the application heat. Again, the forms are passed through an oven at elevated temperatures to provide this heat application.

The forms will then pass through a rinse dip, assuming a coagulant dip was utilized to set up the previous foamed elastomer so as to rinse off coagulant salts. Again, this rinse dip will be in a warm water bath. The next step is a drying and curing operation to obtain a final setting of the various materials applied. Finally, the forms are indexed to a stripping station where the formed gloves are stripped from the forms and excess fibers from the initial fiber application are blown off.

Before describing this invention in more detail, it may be well to note that a variety of final surface characteristics can be obtained, in accordance herewith, simply by the characteristics of the final coating applied. For example, as previously referred to, acrylonitrile may be applied, or alternatively as the final surface coating, polyvinyl chloride. One particularly appropriate application is a porous polymeric coating in the form of a foam for providing an oil grip surface to the ultimate gloves being produced, such as described in co-pending U.S. application No. 436,253, filed Oct. 25, 1982, which application is incorporated herein by reference in its entirety.

It will be appreciated that with the method of the invention here, the gloves produced may have on the surface of each individual glove various combinations of surface characteristics. For example, a textured or wrinkled surface may be applied to the palm of the ultimate glove, while the previously formed liner will provide the backside surface of the glove. By the same token, certain areas of a pair of work boots will require a gripping surface, such as the soles thereof while it may be desirable to have the remaining portion of the boots with a relatively smooth surface which may be easily washed or cleaned. This variation in applied layers to various surfaces of the work gloves such as the cuffs, for example may be varied for flexibility, appearance and/or comfort. Color pigment and course additives may be included in the final surface application to provide texture, gripping characteristics, and to fulfill color design requirements.

DESCRIPTION OF THE DRAWINGS

FIGS. 1(a)-1(i) are a simplified diagramatic illustration showing a single glove form in a step-by-step sequential operation illustrating the process of this invention for forming a glove liner;

FIGS. 2(a)-2(h) also show a simplified diagramatic illustration of a single glove form passing through a sequential series of steps illustrating the process of the invention for applying a selected representative coating surface to a previously formed liner.

DETAILED DESCRIPTION OF THE INVENTION

Figure 1I:
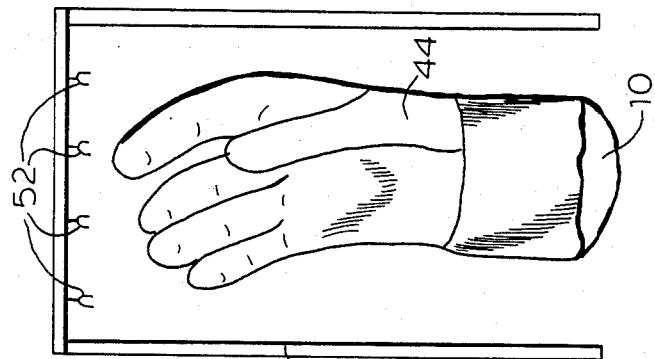
Figure 1H:
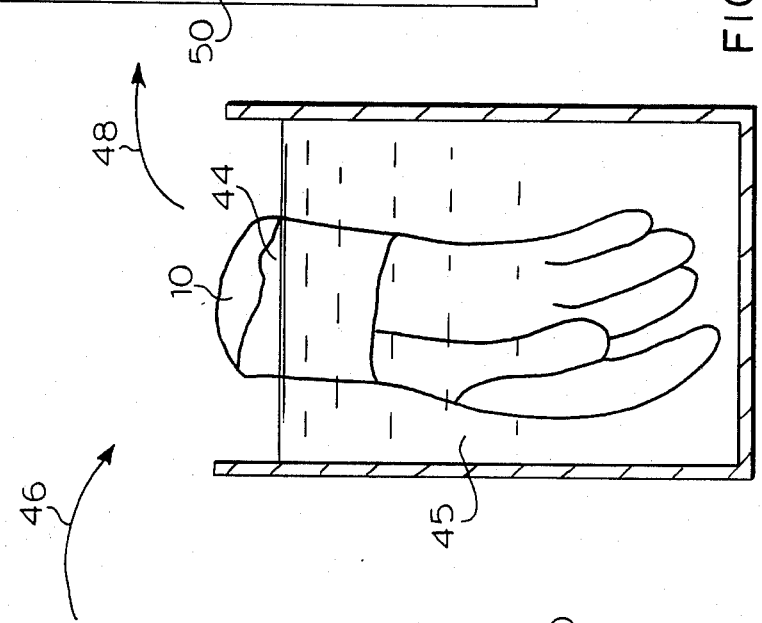
Figure 1G:
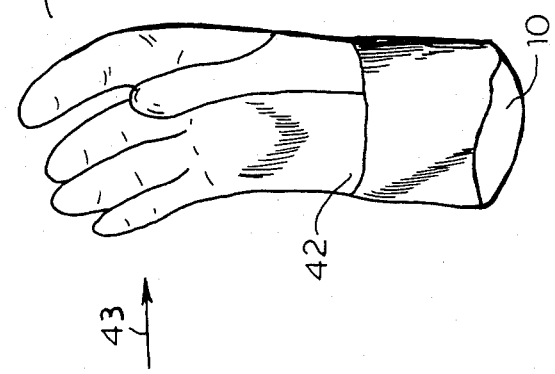

Referring to the drawings in which like reference characters refer to like parts throughout the several views thereof, in FIG. 1(a) a single glove form is shown in its upright position. As discussed previously above, a plurality of such forms are physically mounted on a carriage or mandrel which moves in stages through a production line. The mandrel is mounted on a mechanical device which will allow it to be indexed or tilted upwardly and downwardly at various stages in the production line so that the individual forms mounted on the mandrel may be dipped into baths, as desired, or positioned upright for passing through heated ovens or flock application areas, as desired in a particular selected sequence of operations.

As mentioned, FIGS. 1(a)-1(i) illustrate a sequence of steps for forming the liner of a glove, in accordance with this invention. Thus, form 10, is shown moved in the direction of arrow 14 and indexed into a coagulant dip 12. An also discussed previously, the coagulant dip may be a 40% by weight calcium nitrate water solution. A coagulant dip coating 13 is applied to form 10 in the bath 12. Subsequently, the form 10 is moved as shown by arrow 16 to the next stage of operation wherein the individual forms 10 are positioned upright for passing through a flock application area wherein a compressed air device 20 blows fibers 18 onto the tacky surface of the form formed by the coagulant dip layer 13. The fibers come from a source, not shown, through line 22 under a compressed air application. The fibers may be 100% cotton fibers, as discussed above, or a combination of cotton and polyester, for example. Generally, in the application of the flock, the upright forms will pass through a booth or tunnel area, not shown, so as to contain the fibers blown from the source 20 in a localized area where the forms are actually passing through in a production line. Subsequently, the forms are moved in the direction of arrow 24 to the next stage of operation where the forms come under the application of fan produced compressed air from source 28 for blowing off excess fibers 30. The forms 10 with the fiber coating 26 are next indexed as shown by arrow 32 into a foam dip bath 34 for the application of a foam dip coating 40. As discussed above, this foam dip has the effect of providing "body" for the liner portion of the gloves produced, in accordance herewith.

The next stage, as shown in FIG. 1(f) is a coagulant dip bath 38 for applying a coagulant coating 42 to the foam dip coating 40. This has the effect of setting up the foam resin previously applied, which is preferably an elastomer. It should be pointed out here that between stages 1(e) and 1(f), the forms 10 may be indexed upwardly and a compressed air application applied to the forms in order to remove webs formed between the fingers on the forms so as to provide a true coating on the form of only the surfaces of the form itself.

Subsequent to the coagulation bath 38, the forms 10 are indexed upwardly as shown by arrow 43 and moved to the next stage 1(g) which may be an accumulation stage. That is, the individual mandrels may be accumulated at this point in time if subsequent operations do not require additional coatings for the liner or do not require a leaching operation prior to subsequent applications. For example, if a polyvinyl chloride plastisol surface coating is to be applied subsequently, no leaching is necessary. Otherwise, however, for further processing, the forms 10 are indexed as shown by arrow 46 into the next stage 1(h) which is a leaching bath 45 for obtaining the ultimate liner 44. The forms are maintained in the leaching bath for about 15 minutes in a water bath within the range of between about 80°-90° F. As shown in FIG. 1(i) the forms are subsequently indexed as shown by arrow 48 into an upright position where they pass through an oven hood 50 where heaters 52 apply heat. The passage through hood 50 is timed in the sequence of operations so as to provide a drying time of about about 30 minutes at around 170° F. These times and temperatures may be varied if the content of the applied coatings is varied, as will be understood by practitioners-in-the-art.

Assuming the liners 44 so produced on the forms 10, are to have subsequent coatings applied in order to formulate supported work gloves, the liners 44 on the forms 10 will be indexed to a cooling station for a cool down time of approximately 10-20 minutes.

Figure 2A:
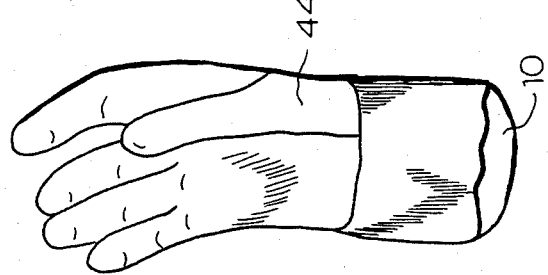
Figure 2B:
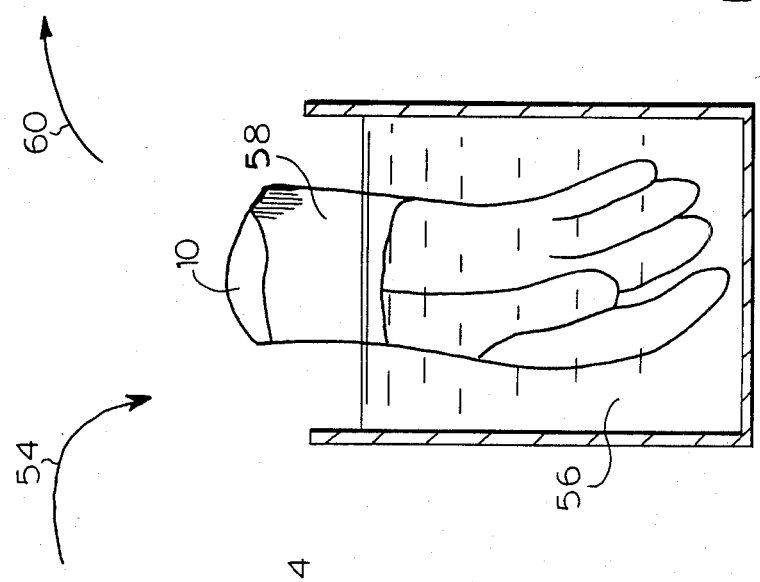
Figure 2C:
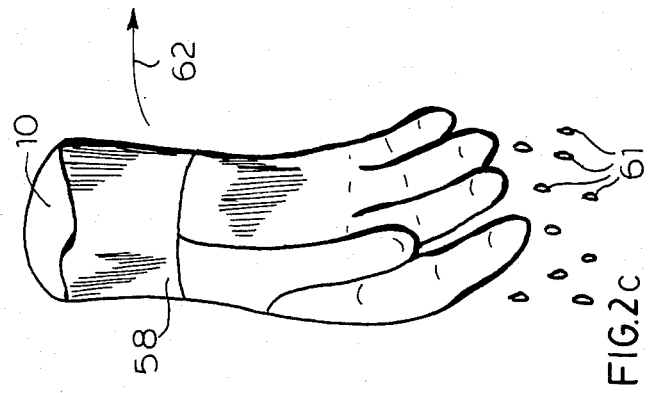

Referring now to FIG. 2(a) the liners 44 on forms 10 are positioned in an upright position in the cooling area and are subsequently moved as shown by arrow 54 and indexed into a bath 56 which may be, for example, an acrylonitrile dip. The specific components of dip 56 will be described in more detail below. At any rate, forms 10 have applied to the liner on their surfaces a coating 58 of acrylonitrile. In the next sequence of operations, as shown in FIG. 2(c), the forms are indexed as shown by arrows 60 in a downward position to the next stage where they are allowed to drip for a period of time to remove excess acrylonitrile 61 from the coating 58. Subsequently, as shown by arrow 62, the forms are indexed to the next stage FIG. 2(d) wherein the forms are positioned in an upright position for the application of compressed air from a source 64 to remove webs 66 formed between the finger stalls of the coating 58.

Subsequent to this stage, the forms are moved to the stage shown in FIG. 2(e) which is a coagulation dip 70 for the application of the dip material 59 to the outer surface of the form 10 over the acrylonitrile coating 58. The coagulation dip 59 has the effect of "setting-up" the acrylonitrile coating previously applied. As shown in FIG. 2(f), the forms 10 are indexed in the direction of arrow 72 to rinse dip 74. Again, this dip is a warm water leaching dip at a temperature of 80°-90° to leach out any soluble materials still in the coating previously applied, such as the salt contained in the coagulant dip solution.

Subsequently, the forms 10 are indexed as shown by arrow 76 to a heating station 78 shown in FIG. 2(g) where the ultimate acrylonitrile coating 58 is dried by passing through the oven hood 78 where heat sources 80 apply heat at about 170° F. In this stage, the line may be arranged to move the forms 10 at a rate so that they are exposed to the temperature for about ten minutes for example. Alternatively, the forms may be moved through the line in a sequence of operations so as to allow them to dry at ambient for a period of about 30 minutes. This may be accomplished in, for example, an accumulation area 84, as shown in FIG. 2(h) where the forms 10 with coatings 58 are accumulated for subsequent stripping operations (after further drying and curing) if no further coatings are to be applied.

At this stage, the gloves produced solely on the forms 10 may be stripped from the forms manually and passed through a compressed air blast to remove any loose fibers on the inside surfaces of the gloves. The originally applied flock is the inner soft comfortable surface for such gloves and any loose fibers are removed in this manner.

Figure 3C:
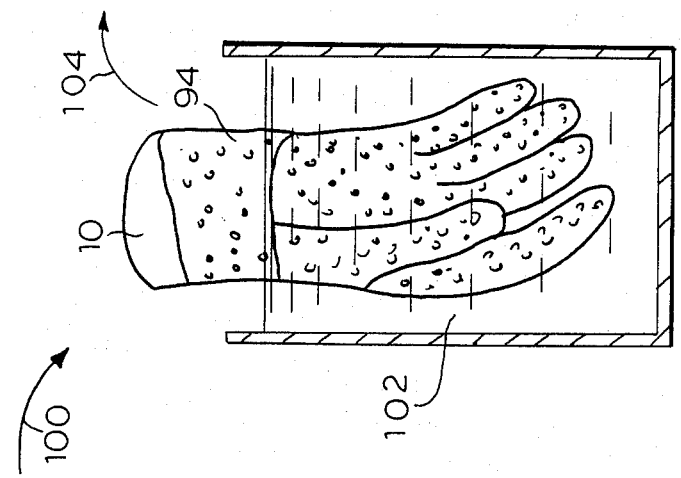
FIGS. 3(a) through 3(f) show a simplified diagramatic illustration of the invention wherein a single glove form passes through a series of sequential steps for applying an additional desired outer textured surface for illustrating a further sequential series of steps which may be utilized in accordance with this invention.
Figure 3B:
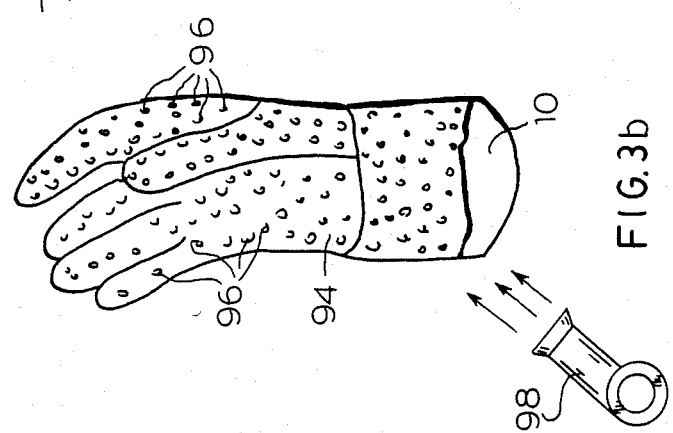
Figure 3A:
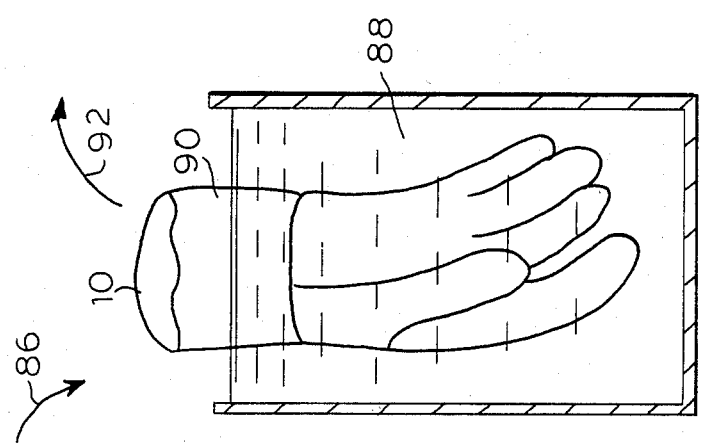
Figure 3E:
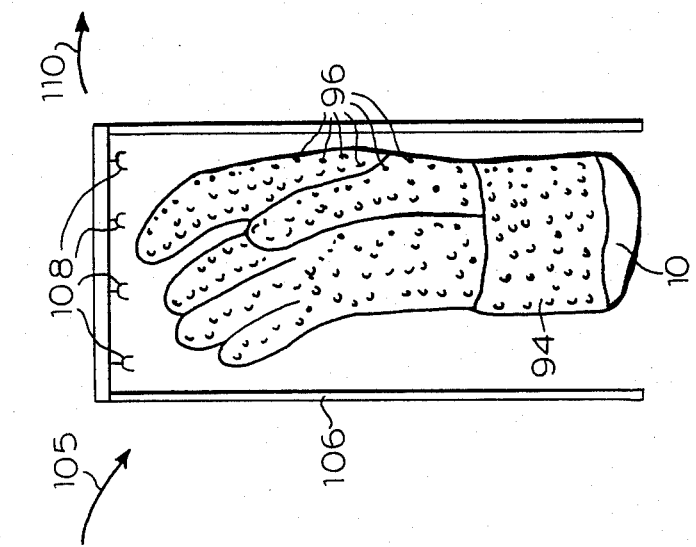
Figure 3D:
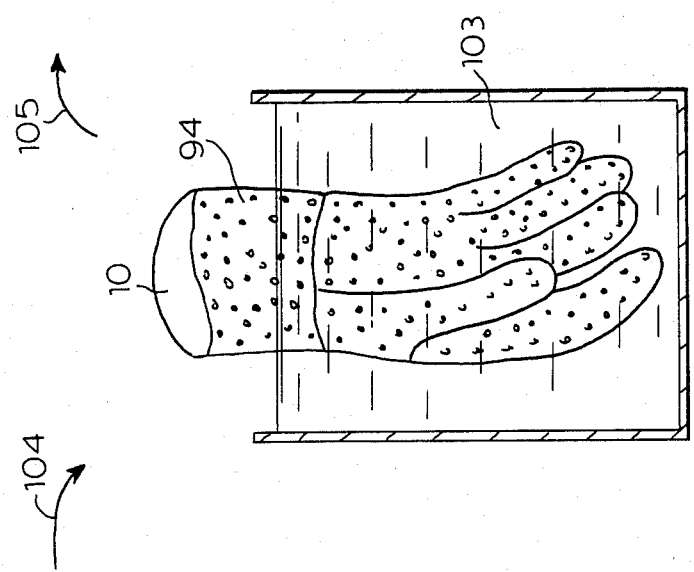

A further representative application may be applied to the gloves 58 alredy previously formed, as described above. If this is the case, the forms 10 are indexed in the direction of arrow 86 into, for example, a porous finish foam dip. This may be an acrylonitrile-butadiene copolymer latex, for example. It may be thickened to a state where the individual cells thereof will form, in a sequence of operations hereof a porous textured surface for providing a gripping surface for certain applications of industrial gloves, as will be understood by practitioners-in-the-art. Thus, in FIG. 3(a), the forms 10 are indexed into the porous finish foam dip 88 for the application of the porous finish foam layer 90 on forms 10. The forms 10 are then indexed in the direction of arrow 92 to an upright position where they pass through a compressed air stage under the application of compressed air from source 98. The compressed air has the effect of blowing out the webs in the finger stalls in the foamed surface so as to provide the porous textured surface 94 desired. It will be appreciated, that depending upon the selection of the foam material to be applied, the degree of texture and roughness ultimately formed in the surface 94 will not necessarily be one that is felt by an individual examining the surface. The texture or roughness may be so minute that it is only discernible by a magnifying glass of some sort. The degree of texture or roughness, as will be understood may be varied to this extent in accordance with this invention so as to provide a great variety of different surfaces, as desired. Subsequent to the blowing out of the webs as shown in FIG. 3(b), the forms 10 are indexed in the direction of arrow 100 to the stage shown in FIG. 3(c) which is an additional coagulant dip bath 102. Again, this bath has the effect of setting up the coating 94. The coagulant dip bath 102 is followed by the usual water rinse bath 103 and the forms are indexed as shown by arrow 104.

Subsequent to the bath 103, the forms 10 are indexed in the direction of arrow 105 to an additional heat and cure application which may be in an elongated heating hood or oven 106 wherein the mandrels holding the forms 10 are conducted through the hood 106 under the application of heat 108 so as to apply to the coating 94 with the textured pores 96 a drying sequence of 30-45 minutes at 170° F. followed by a curing cycle of 45 minutes at 280° F.

Figure 3F:
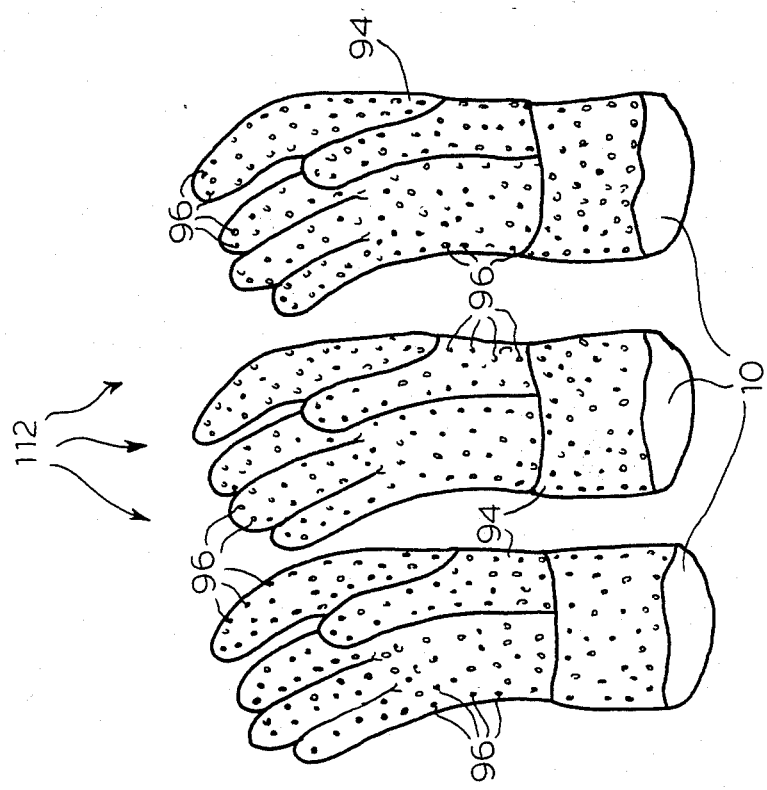

Subsequent to the heating and curing operations, the forms 10 are indexed in the direction of arrow 110 to an accumulation stage 112 in FIG. 3(f) where the individual gloves with the acrylonitrile-butadiene foamed coating 94 thereon may be manually stripped, as described previously as shown in the accumulation stage 84 wherein the stripped gloves pass through compressed air for removing any loose flock fibers.

With respect to the resin coatings including elastomers used for coating the wearing apparel produced in accordance with this invention, purely illustrative representative compositions are listed below. It is to be understood, however, that these examples are being presented with the understanding that they are to have no limiting character on the broad disclosure of the invention as generally set forth herein as as directed to men skilled in the art.

COMPOSITION 1 (FOAM)

Acrylonitrile-butadiene copolyer latex—(a typical formula in parts per hundred based upon the dry rubber).

| Material | Amount |
| --- | --- |
| Latex (dry rubber) | 100 |
| Antioxident | 2.5 |
| Flock | 13.3 |
| Titanium Dioxide | 3.0 |
| Foam Stabilizer | 0.05 |

The materials in the formula noted above are thickened to approximately 1000 cps with methylcellulose. The resulting material is foamed to a preferred 30% air content, based on the weight of the material being foamed. In this connection foaming may be to an air content within the range of between about 5% and 70%.

COMPOSITION 2 (OVERDIP)

Acrylonitile-butadiene copolymer overdip for use in the stage two sequence of operation applied to the already formed liner (in parts per hundred based on the dry rubber).

| Material | Amount |
| --- | --- |
| Latex (dry rubber) | 100 |
| Stabilizer | 1.0 |
| Zinc Oxide | 3.0 |

This material is thickened to a desired viscosity, again with methylcellulose. The thickening is to within the range of between about 2000 and 5000 cps, depending on the desired coating weight ultimately to be achieved in the gloves being produced.

COMPOSITION 3

Foam rough finish grip. Acrylonitrile-butadiene copolymer latex (formulation based upon parts per hundred dry rubber).

| Material | Amount |
| --- | --- |
| Latex (dry rubber) | 100 |
| Stabilizer | 1.0 |
| Zinc Oxide | 3.0 |

The material is thickened to 1000 cps with methylcellulose and then foamed to a 30% air content.

COMPOSITION 4

Polyvinyl chloride plastisol dip. This composition will be utilized if a polyvinyl chloride coating is to be applied as a substitution for the acrylonitrile-butadiene application described in detail above (based upon parts per hundred of PVC).

| Material | Amount |
| --- | --- |
| Polyvinyl Chloride Resin | 100 |
| Plasticizer-Dioctyl Phthalate | 122. |
| Stabilizer | 0.8 |
| Filler | 20.0 |

COMPOSITION 5

This composition is an adhesive dip formula which is utilized prior to the application of a polyvinyl chloride plastisol coating in order to provide an adhesive coating for the application of an intervening flock. It is comprised of acrylonitrile-butadiene copolymer based on parts per hundred of dry rubber.

| Material | Amount |
| --- | --- |
| Latex (dry rubber) | 100 |
| Stabilizer | 1.0 |
| Zinc Oxide | 3.0 |

While the above examples disclose procedures for making gloves as protective wearing apparel, it will be appreciated by those skilled in the art that the method of the invention here and the built-up materials forming the wearing apparel so produced by the method may be utilized for any wearing apparel where a form may be provided for building up the ultimate garment desired. Moreover, a variety of textured and decorative surfaces may be provided merely by a selection of the materials to be applied the manner and sequence of application, and their various characteristics. Moreover, the wearing apparel so produced will have an enhanced protective quality as well as the comfort and aesthetic properties desired.

As discussed previously, if a polyvinyl chloride plastisol overcoat is to be applied then it is not necessary to leach the previously formed liners. A representative procedure for applying a polyvinyl chloride plastisol coating includes dipping the molds with the liners in an adhesive dip as described above under Composition 5, applying a second flock coating of cotton fibers followed by a drying and coating procedure. Thereafter the coated forms are dipped in the polyvinyl chloride plastisol dip described under Composition 4 which is then gelled for a short period of time of 1 and ½ minutes at 370° to 400° F. followed by a polyvinyl chloride rough finish dip which may be foamed plastisol. The two polyvinyl chloride coatings are then fused by the application of heat for 15 to 20 minutes at 370° to 390° F.

While the methods and products herein disclosed form preferred embodiments of the invention, this invention is not limited to those specific methods and products, and changes can be made herein without departing from the scope of the invention, which is defined in the appended claims. For example, as will be appreciated by practitioners-in-the-art, different elastomer coatings may be utilized, comprised of a wide variety of combinations of polymers, in order to have an ultimate final surface on the wearing apparel of varying properties which may include soft pliable surfaces or hard impervious surfaces. Moreover, the formulations of these compositions may be varied to have specialized properties including oil grip, breathability, moisture barrier, cut resistance, temperature resistance and combinations of decorative color and texture.

What is claimed is:

1. A work glove, said glove formed in place on a mold passing through a production line; said glove formed by the steps of
   (a) dipping in a second dipping step said plurality of liners formed on said molds in an adhesive dip;
   (b) indexing said plurality of molds from said second dipping step upwardly;
   (c) applying a third applying step by blowing a quantity of said fibers from said first selecting step onto the surfaces of said formed liners on said plurality of molds;
   (d) blowing off excess fibers from said molds from said third applying step;
   (e) applying elevated temperatures to said plurality of molds from said third applying step for a period of time sufficient to dry said plurality of partially formed gloves thereon; and
   (f) applying higher elevated temperatures to said plurality of molds from said drying step for a time sufficient to process to final form the said plurality of partially formed gloves on said plurality of molds.

2. A work glove, said glove formed in place on a mold passing through a production line; said glove formed by the steps of
   (a) indexing and dipping in a third dipping step said plurality of partially formed gloves according to claim 1 into a polyvinyl chloride plastisol dip;
   (b) indexing said forms from said third dipping step upright;
   (c) moving said indexed molds from said third dipping step into an air blast to blow out webs formed thereon;
   (d) exposing in a first exposing step, said plurality of molds with said partially formed gloves thereon to elevated temperatures to gel the polyvinyl chloride plastisol coating from said third dipping step;
   (e) dipping in a fourth dipping step said plurality of molds with said partially formed gloves thereon from said first exposing step into a polyvinyl chloride porous finish dip;
   (f) indexing said forms from said fourth dipping step upwardly;
   (g) exposing in a second exposing step said formed gloves on said plurality of molds to elevated temperatures for a time sufficient to fuse said gloves; and
   (h) cooling said gloves on said plurality of molds from said second exposing step.

3. A work glove liner, said liner formed in place on a mold passing through a production line; said liner formed by the steps of
   (a) arranging a plurality of glove molds in a production line;
   (b) dipping in an agent which functions as a coagulant, mold surface release and adhesive agent, in a first dipping step, said plurality of molds;
   (c) selecting in a first selecting step a quantity of flocking fibers selected from the group consisting of cellulosic and non-cellulosic fibers;
   (d) applying in a first applying step by blowing onto the surface of said plurality of molds from said dipping step a quantity of said fibers from said first selecting step;
   (e) selecting in a second selecting step a liquid natural or synthetic resin;
   (f) foaming said resin selected in said second selecting step;
   (g) applying in a second applying step said foamed liquid synthetic resin to the fiber coated surfaces of said plurality of said glove molds from said first step;
   (h) curing fusing or otherwise processing to a final form said foamed liquid natural or synthetic resin coating from said second applying step; and
   (i) drying said liners formed on the surfaces of said plurality of molds.

4. A work glove, said glove formed in place on a mold passing through a production line; said glove formed by the steps of
   (a) dipping in a third dipping step said plurality of liners formed on said molds according to claim 3 into a acrylonitrile-butadrene copolymer latex bath;
   (b) indexing said plurality of molds from said third dipping step upright;
   (c) moving said indexed molds from said third dipping step into an air blast for blowing out webs formed in said third dipping step;
   (d) dipping in a fourth dipping step said plurality of molds from said moving and air blast step into a coagulant bath;
   (e) indexing and dipping in a fifth dipping step said plurality of molds from said fourth dipping step in a water bath to leach out salts in the gloves formed on said liners on said plurality of molds; and
   (f) drying said plurality of gloves on said plurality of forms from said fifth dipping step.

5. A process for producing a plurality of glove liners simultaneously on glove molds, characterized by the steps of
   (a) arranging a plurality of glove molds in a production line;
   (b) dipping in an agent which functions as a coagulant mold surface release and adhesive agent, in a first dipping step said plurality of molds;
   (c) selecting in a first selecting step a quantity of flocking fibers selected from the group consisting of cellulosic and non-cellulosic fibers;
   (d) applying in a first applying step by blowing onto the surface of said plurality of molds from said first dipping step a quantity of said fibers from said first selecting step;

(e) selecting in a second selecting step a liquid natural or synthetic resin;

(f) foaming said resin selected in said second selecting step;

(g) applying in a second applying step said foamed liquid natural or synthetic resin to the fiber coated surfaces of said plurality of said glove molds from said first applying step;

(h) curing fusing, or otherwise processing to a final form said foamed liquid natural or synthetic resin coating from said second applying step; and (i) drying said liners formed on the surfaces of said plurality of molds.

6. The process of claim 5, further characterized by
(a) said curing step being carried out by dipping said plurality of molds in a coagulant dip comprised of a calcium nitrate solution.

7. The process of claim 5, further characterized by
(a) said curing step being carried out by exposing said plurality of molds to elevated temperatures sufficient to cure said liquid synthetic resin coating applied in said second applying step.

8. The process of claim 6, further characterized by
(a) dipping in a second dipping step said plurality of molds from said curing step in a leaching bath to leach out salts from said curing step.

9. The process of claim 5, further characterized by
(a) said drying step being carried out by exposing said plurality of molds to elevated temperatures for a period of time sufficient to dry the liner coated plurality of molds from said curing step.

10. The process of claim 9, further characterized by
(a) said elevated temperature is about 170° F.; and
(b) said time is about 30 minutes.

11. The process of claim 5, further characterized by
(a) said fibers have a denier within the range of between about 3 and 5; and
(b) said fibers have a length within the range of between about 1.0 and 12.5 millimeters.

12. The process of claim 5, further characterized by
(a) said fibers from said first selecting step are selected from the group consisting of cotton, polyester, nylon and mixtures thereof.

13. The process of claim 5, further characterized by
(a) said liquid natural or synthetic resin from said second selecting step is a member selected from the group consisting of natural rubber, neoprene, polyurethane, acrylonitrile-butadiene copolymer, polyvinyl chloride, acrylonitrile-butadiene-styrene terpolymer and mixtures thereof.

14. The process of claim 5, further characterized by
(a) said mold release and adhesive agent is 40% by weight calcium nitrate in water.

15. The process of claim 5, further characterized by
(a) stripping said formed liners from said plurality of molds; and
(b) blowing residual loose fibers from the internal surfaces of said stripped liners.

16. A method for producing a work glove comprising moving said plurality of liners on said forms produced by the method of claim 4 to a further stage in a production line, further characterized by the steps of
(a) dipping in a third dipping step said plurality of formed liners on said molds into an acrylonitrile-butadiene copolymer latex bath;

(b) indexing said plurality of molds from said third dipping step upright;

(c) moving said indexed molds from said third dipping step into an air blast for blowing out webs formed in said third dipping step;

(d) dipping in a fourth dipping step said plurality of molds from said moving and air blast step into a coagulant bath;

(e) indexing and dipping in a fifth dipping step said plurality of molds from said fourth dipping step in a water bath to leach out salts in the gloves formed on said liners on said plurality of molds; and (f) drying said plurality of gloves on said plurality of forms from said fifth dipping step.

17. The process of claim 16, further characterized by
(a) said coagulant bath is 40% by weight calcium nitrate in a water solution.

18. The process of claim 16, further characterized by
(a) said drying step being carried out at an elevated temperature of about 170° F. for about 30 minutes.

19. The process of claim 16, further characterized by
(a) stripping said gloves formed on said plurality of molds; and
(b) blowing loose fibers from the surfaces of said plurality of stripped gloves.

20. The process of claim 16, further characterized by
(a) indexing and dipping in a sixth dipping step said plurality of forms each having a formed glove thereon into a porous finish foam dip, said foam dip being foamed to have an air content within the range of between about 5 and 70 percent;
(b) indexing said plurality of molds from said sixth dipping step in a seventh dipping step into a coagulant dip;
(c) indexing said plurality of molds from said seventh dipping step in an eighth dipping step into a water bath to leach out salts in the gloves on said plurality of forms;
(d) indexing and drying said gloves formed on said plurality of molds; and
(e) curing said gloves formed on said plurality of molds.

21. The process of claim 20, further characterized by
(a) stripping said gloves formed on said plurality of molds; and
(b) blowing loose fibers from the surfaces of said plurality of stripped gloves.

22. The process of claim 20, further characterized by
(a) said drying being carried out for within the range of between about 30 and 45 minutes at about 170° F.

23. The process of claim 20, further characterized by
(a) said curing step being carried out for 45 minutes at 280° F.

24. A method for producing a work glove, comprising moving said plurality of liners on said forms produced by the method of claim 3 to a further stage in a production line, further characterized by the steps of
(a) dipping in a second dipping step said plurality of formed liners on said molds in an adhesive dip;
(b) indexing said plurality of molds from said dipping step upwardly;
(c) applying in a third applying step a quantity of said fibers from said first selecting step to the surfaces of said formed liners on said plurality of molds;
(d) blowing off excess fibers from said molds from said third applying step;

(e) applying in a fourth applying step elevated temperatures to said plurality of molds from said third applying step for a period of time sufficient to dry said plurality of partially formed gloves thereon; and (f) applying in a fifth applying step higher elevated temperatures than said fourth applying step to said plurality of molds from said drying step for a time sufficient to process to final form the said plurality of partially formed gloves on said plurality of molds.

25. The process of claim 24, further characterized by
(a) said drying step is carried out at 170° F. for 30 minutes.

26. The process of claim 24, further characterized by
(a) said fifth applying step is carried out at 280° F. for 45 minutes.

27. The process of claim 16, comprising moving said plurality of partially formed gloves, on said forms produced by the method of claim 20 to a further stage in a production line, further characterized by the steps of
(a) indexing and dipping in a third dipping step said plurality of partially formed gloves into a polyvinyl chloride plastisol dip;
(b) indexing said forms from said third dipping step upright;
(c) moving said indexed molds from said third dipping step into an air blast to blow out webs formed thereon;
(d) exposing in a first exposing step, said plurality of molds with said partially formed gloves thereon to elevated temperatures to gel the polyvinyl chloride plastisol coating from said third dipping step;
(e) dipping in a fourth dipping step said plurality of molds with said partially formed gloves thereon from said first exposing step into a polyvinyl chloride porous finish dip;
(f) indexing said forms from said fourth dipping step upwardly;
(g) exposing in a second exposing step said formed gloves on said plurality of molds to elevated temperatures for a time sufficient to fuse said gloves; and
(h) cooling said gloves on said plurality of molds from said second exposing step.

28. The process of claim 27, further characterized by
(a) stripping said gloves formed on said plurality of molds; and
(b) blowing loose fibers from the surfaces of said plurality of stripped gloves.

29. The process of claim 27, further characterized by
(a) said first exposing step is carried out at within the range of between about 370°–400° F. for one and one-half minutes.

30. The process of claim 27, further characterized by
(a) said second exposing step is carried out at within the range of between about 370° and 390° F. for about seventeen minutes.

* * * * *

UNITED STATES PATENT AND TRADEMARK OFFICE
CERTIFICATE OF CORRECTION

PATENT NO. : 4,519,098
DATED : May 28, 1985
INVENTOR(S) : Dunmire et al.

It is certified that error appears in the above-indentified patent and that said Letters Patent is hereby corrected as shown below:

Column 3, lines 35 through 50, the chart should read:

|  | AKROFLOCK$^R$ CWV-1 | CLAREMONT |
|---|---|---|
| Raw Material-Cotton | 100% | 100% |
| Insolubles | Less than 1% | Less than 1% |
| Bulk Density – |  |  |
| ML/50 Grams | 215 | 216 |
| Moisture | 5-7% | 5-7% |
| Oil Absorption – |  |  |
| cc/10 Grams | 30 | 30 |
| Screen Analysis -% on |  |  |
| 40 mesh | 0 | 0 |
| 60 mesh | Trace | Trace |
| 80 mesh | 3-5 | 3-5 |
| 100 mesh | 8-12 | 8-12 |
| 140 mesh | 10-15 | 10-15 |
| 200 mesh | 15-20 | 15-20 |
| 270 mesh % thru | 50-60 | 50-60 |

Signed and Sealed this

Twenty-sixth Day of October, 1993

BRUCE LEHMAN

*Attest:*

*Attesting Officer*            *Commissioner of Patents and Trademarks*